(12) United States Patent
Balasubramanian et al.

(10) Patent No.: US 9,471,939 B1
(45) Date of Patent: Oct. 18, 2016

(54) PRODUCT RECOMMENDATIONS BASED ON ANALYSIS OF SOCIAL EXPERIENCES

(71) Applicant: International Business Machines Corporation, Armonk, NY (US)

(72) Inventors: Swaminathan Balasubramanian, Troy, MI (US); Mark Bell, Nice (FR); Gregory J. Boss, Saginaw, MI (US); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/724,847

(22) Filed: May 29, 2015

(51) Int. Cl.
*G06Q 30/06* (2012.01)
*G06Q 50/00* (2012.01)

(52) U.S. Cl.
CPC .......... *G06Q 30/0631* (2013.01); *G06Q 50/01* (2013.01)

(58) Field of Classification Search
None
See application file for complete search history.

(56) References Cited

U.S. PATENT DOCUMENTS

| | | |
|---|---|---|
| 8,386,329 B1 | 2/2013 | Baughman et al. |
| 2010/0208997 A1 | 8/2010 | Xie et al. |
| 2011/0178871 A1 | 7/2011 | Watfa et al. |
| 2013/0073336 A1* | 3/2013 | Heath ............... G06Q 30/02 705/7.29 |
| 2013/0084001 A1 | 4/2013 | Bhardwaj et al. |
| 2014/0244361 A1 | 8/2014 | Zhang et al. |
| 2014/0279068 A1* | 9/2014 | Systrom .......... G06Q 30/0277 705/14.73 |
| 2014/0365581 A1* | 12/2014 | Kennon ............ G06Q 50/01 709/205 |
| 2015/0100377 A1* | 4/2015 | Penumaka ........ G06Q 30/0201 705/7.29 |
| 2015/0100454 A1 | 4/2015 | Cook et al. |
| 2016/0055250 A1* | 2/2016 | Rush ............... G06F 17/30867 707/733 |

FOREIGN PATENT DOCUMENTS

WO 2013169476 A2 11/2013

OTHER PUBLICATIONS

Wang et al., Argo: Intelligent Advertising by Mining a Users Interest from His Photo Collections, Jun. 2009, ACM, pp. 18-26.*
Wikipedia, "Recommender System," Wikipedia: the Free Encyclopedia, Last Modified on Apr. 1, 2015, p. 1-13, http://en.wikipedia.org/wiki/Recommender_system, Accessed on May 1, 2015.
IBM, "List of IBM Patents Applications Treated as Related (Appendix P)," Jun. 15, 2016, p. 1-2.
Balasubramanian et al., "Product Recommendations Based on Analysis of Social Experiences," Application and Drawings, filed Feb. 29, 2016, 32 Pages, U.S. Appl. No. 15/055,768.

* cited by examiner

*Primary Examiner* — Alan Chen
(74) *Attorney, Agent, or Firm* — Michael O'Keefe

(57) ABSTRACT

A method for recommending products. The method may include receiving an identification element associated with an image or a visual code captured by a user. The method may include identifying a first item associated with the identification element, whereby the first item is a product or a service. The method may include identifying at least one of a tag and a keyword associated with the first item. The method may include identifying social media interactions within a social media network that reference at least one of the first item, the tag, and the keyword, whereby the social media network is associated with the user. The method may further include identifying a second item referenced in the social media interactions, whereby the second item is a product or a service. The method may also include determining a score for the second item based on an algorithm.

14 Claims, 5 Drawing Sheets

PRODUCT RECOMMENDATIONS BASED ON ANALYSIS OF SOCIAL EXPERIENCES

FIELD OF INVENTION

The present invention relates generally to the field of computing, and more particularly to product recommendation systems.

BACKGROUND

An information filtering system is a system that remove redundant or unwanted information from a data stream. Recommender, or recommendation systems are a subclass of information filter systems that analyze user data in order to predict user preferences. For example, recommender systems may be used to suggest media to subscribers of a streaming movie and television service. Additionally, recommender systems may be used to suggest social media accounts a user may wish to follow on a social media platform based on the user's social media profile.

SUMMARY

According to one embodiment, a method for recommending products. The method may include receiving an identification element associated with an image or a visual code captured by a user. The method may also include identifying a first item associated with the identification element, whereby the first item is one of a product or a service. The method may further include identifying at least one of a tag and a keyword associated with the first item. The method may also include identifying at least one social media interaction within a social media network that references at least one of the first item, the tag, and the keyword, whereby the social media network is associated with the user. The method may further include identifying at least one second item referenced in the at least one social media interaction, whereby the at least one second item is a product or a service. The method may also include determining a score for the at least one second item based on an algorithm, whereby the algorithm determines the score for the at least one second item based on a frequency the at least one second item appears in the at least one social media interaction.

According to another embodiment, a computer system for recommending products. The computer system may include one or more processors, one or more computer-readable memories, one or more computer-readable tangible storage medium, and program instructions stored on at least one of the one or more tangible storage medium for execution by at least one of the one or more processors via at least one of the one or more memories, whereby the computer system is capable of performing a method. The computer system may include receiving an identification element associated with an image or a visual code captured by a user. The computer system may also include identifying a first item associated with the identification element, whereby the first item is one of a product or a service. The computer system may further include identifying at least one of a tag and a keyword associated with the first item. The computer system may also include identifying at least one social media interaction within a social media network that references at least one of the first item, the tag, and the keyword, whereby the social media network is associated with the user. The computer system may further include identifying at least one second item referenced in the at least one social media interaction, whereby the at least one second item is a product or a service. The computer system may also include determining a score for the at least one second item based on an algorithm, whereby the algorithm determines the score for the at least one second item based on a frequency the at least one second item appears in the at least one social media interaction.

According to yet another embodiment, a computer program product for recommending products. The computer program product may include one or more computer-readable tangible storage medium and program instructions stored on at least one of the one or more tangible storage medium, the program instructions executable by a processor. The computer program product may include program instructions to receive an identification element associated with an image or a visual code captured by a user. The computer program product may also include program instructions to identify a first item associated with the identification element, whereby the first item is one of a product or a service. The computer program product may further include program instructions identify at least one of a tag and a keyword associated with the first item. The computer program product may also include program instructions to identify at least one social media interaction within a social media network that references at least one of the first item, the tag, and the keyword, whereby the social media network is associated with the user. The computer program product may further include program instructions to identify at least one second item referenced in the at least one social media interaction, whereby the at least one second item is a product or a service. The computer program product may also include program instructions to determine a score for the at least one second item based on an algorithm, whereby the algorithm determines the score for the at least one second item based on a frequency the at least one second item appears in the at least one social media interaction.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
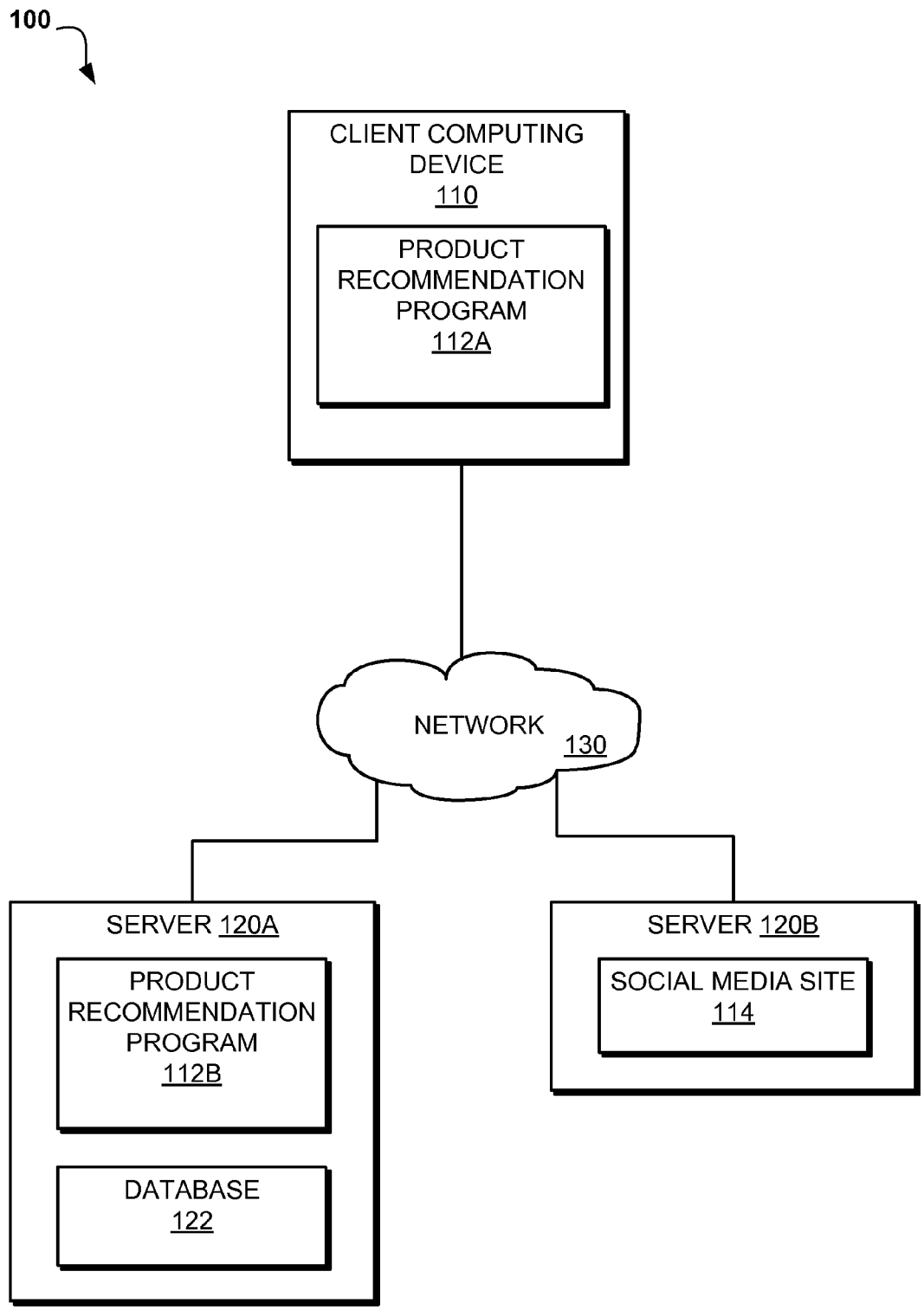
FIG. 1 is an illustration of a networked computer environment of a product recommendation system, in accordance with one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to product recommendation systems. The following described exemplary embodiments provide a system, method, and program product to, among other things, recommend products or services based on social media interactions. Therefore, embodiments of the present invention may have the capacity to improve the technical field of product recommendation systems by utilizing social media interactions on a user's social media network to provide product and service recommendations to a user. More specifically, the present embodiment may extract tags and/or keywords from a user submitted element associated with a product or service and analyze a social media network for the extracted tags and/or keywords to determine other products or services closely related to the product or service associated with the user submitted element.

As previously described, recommendation systems are a subclass of information filter systems that analyze user data in order to predict user preferences. Recommendation systems may use collaborative filtering or content-based filtering to determine the user preferences.

Collaborative filtering may employ the collection and analysis of habits and preferences from multiple users to predict the interests and preferences of a single user towards similar items or services. For example, if a customer to an online marketplace views a pair of pink sneakers, the customer may suggest the user view a green pair of sneakers since other customers viewed a green pair of sneakers when also viewing a pink pair of sneakers. As such, collaborative filtering may recommend products or services to a user based on the interests of other users searching for the same product or service.

Content-based filtering may analyze a description of an item and user preferences to make product and service suggestions. Content-based filtering may recommend products or services that are similar to previous products and services in which the specific user may have been previously interested. For example, if a user was previously interested in a pink shirt, the user may be presented with a variety of pink sneakers when the user conducts a search for shoes on an online marketplace.

Furthermore, a hybrid recommender system may exist that combines the approaches of collaborative filtering and content-based filtering. A hybrid recommender system may combine collaborative filtering predictions and content-based predictions by separately combining the predictions of both approaches, by adding collaborative-based capabilities to content-based capabilities, or vice versa, or by combining elements of both approaches into a single model. For example, Netflix® (Netflix and all Netflix-based trademarks and logos are trademarks or registered trademarks of Netflix, Inc. and/or its affiliates) utilizes a hybrid recommender system to make media suggestions to users. The recommendations made by the Netflix® video streaming service to a user are made by comparing habits of other system users as well as suggesting content sharing similar characteristics to that which the specific user has viewed and rated highly.

Recommendation systems may rely on users performing overt actions, such as setting system preferences and tracking purchase histories. However, recommendation systems may not incorporate the user experiences encountered by users on social media networks, or social media platforms. Online social media networks, such as Facebook® (Facebook and all Facebook-based trademarks and logos are trademarks or registered trademarks of Facebook, Inc. and/or its affiliates) and Twitter® (Twitter and all Twitter-based trademarks and logos are trademarks or registered trademarks of Twitter, Inc. and/or its affiliates) present unique information shared by users, such as pictures, videos, location information, user likes, user dislikes, and comments, that may be beneficial for recommendation systems to analyze when suggesting content. As such, it may be advantageous, among other things, to implement a system that is capable of analyzing social media experiences to recommend products or services to a user.

According to one embodiment, when a user captures an identification element, such as a picture or a product identification code, keywords associated with the element may be extracted. The extracted keywords may be used to identify a product or service associated with the element. Social network profiles associated with the user are then analyzed for references to the product or service. The references may be identified in social media interactions, such as status updates or posted images or videos. Within each reference, a set of items mentioned in the social media interaction may be identified. Each item within the set may be assigned a relevancy score based on the frequency the item appears within the references associated with the identified product or service. A categorized list of the items based on the assigned relevancy score may be presented to the user across multiple dimensions, such as people, places, things, and times, identified in the social network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to analyze social media experiences to provide product and service recommendations to users. According to at least one implementation, the present embodiment may allow analysis of an identification element, such as a visual code or image, associated with a product or service to determine particular keywords or tags representative of the product or service. Social media accounts associated with a user may then be searched for references to the product or service represented by the identification element. Other products or services mentioned by users in the references may be identified and assigned a score based on an algorithm that assigns scores depending on the number of appearances a product or service appears among all the identified references. After categorization, the products or services assigned a score may be presented to a user as suggested products or services the user may be interested in based on the user's interest in the original product or service represented in the identification element.

Referring now to FIG. 1, an exemplary networked computer environment 100 is depicted, in accordance with one embodiment. The networked computer environment 100 may include a client computing device 110 that is enabled to run product recommendation program 112A. The networked computer environment 100 may also include a server 120A that is enabled to run product recommendation program 112B and a communication network 130. The networked computer environment 100 may include a plurality of client computing devices 110, only one of which is shown for illustrative brevity, and servers 120A, 120B, only two of which are shown for illustrative brevity. According to at least one implementation, the present embodiment may also include a repository, such as database 122, which may be running on server 120A. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 110 may communicate with server computers 120A, 120B via communications network 130. The communications network 130 may include connections, such as wire, wireless communication links, or fiber optic cables. As will be discussed with reference to FIG. 5, server computer 120A, 120B may include internal components 800a and external components 900a, respectively, and client computing device 110 may include internal components 800b and external components 900b, respectively. Client computing device 110 may be, for example, a mobile device, a telephone, a personal digital assistant, a netbook, a laptop computer, a tablet computer, a desktop computer, or any type of computing device capable of running a program and accessing a network.

Server computer 120A, 120B may be a laptop computer, netbook computer, personal computer (PC), a desktop computer, or any programmable electronic device capable of hosting product recommendation program 112B, database 122, social media site 114, and communicating with client device 110 via network 130, in accordance with embodiments of the invention. Server computer 120A, 120B may include internal and external hardware components, as depicted and described in further detail below with reference to FIG. 5. Server 120A, 120B may also operate in a cloud computing service model, such as Software as a Service (SaaS), Platform as a Service (PaaS), or Infrastructure as a Service (IaaS). Server 120A, 120B may also be located in a cloud computing deployment model, such as a private cloud, community cloud, public cloud, or hybrid cloud.

According to the present embodiment, social media site 114 may be a collection of files including, for example, HTML files, CSS files, image files, and JavaScript files. Social media site 114 may also include other resources such as audio files and video files. In an exemplary embodiment, social media site 114 may be a social media website, such as Facebook®, Twitter®, Instagram® (Instagram and all Instagram-based trademarks and logos are trademarks or registered trademarks of Facebook, Inc. and/or its affiliates), and Google+® (Google+ and all Google+-based trademarks and logos are trademarks or registered trademarks of Google Inc. and/or its affiliates). Social media site 114 may host a user social media network. The user social media network may include user contacts, such as friends or followers, and social media interactions, such as images, videos, and text posts.

According to the present embodiment, a program, such as product recommendation program 112A and 112B may run on client computing device 110 or on server computer 120A. Product recommendation program 112A, 112B may identify a product or service within a user captured element, search for interactions on social media site 114 containing references to the product or service, and present related products or services to the user. The product recommendation method is explained in further detail below with respect to FIG. 2.

According to the present embodiment, a repository, such as database 122, may run on server 120A. Database 122 may contain tags or keywords associated with products that may be used by product recommendation program 112A, 112B to identify a product or service in the captured element. Database 122 may also be a metarepository. A metarepository is a repository that incorporates other repositories by references. Database 122 may also be one or more repositories, only one of which is shown for illustrative brevity, located on one or more servers 120A, 120B, only one of which is shown for illustrative brevity. In at least one embodiment, database 122 may be an internet search engine, a catalog of products or services, or a proprietary database maintained by a third party.

Figure 2:
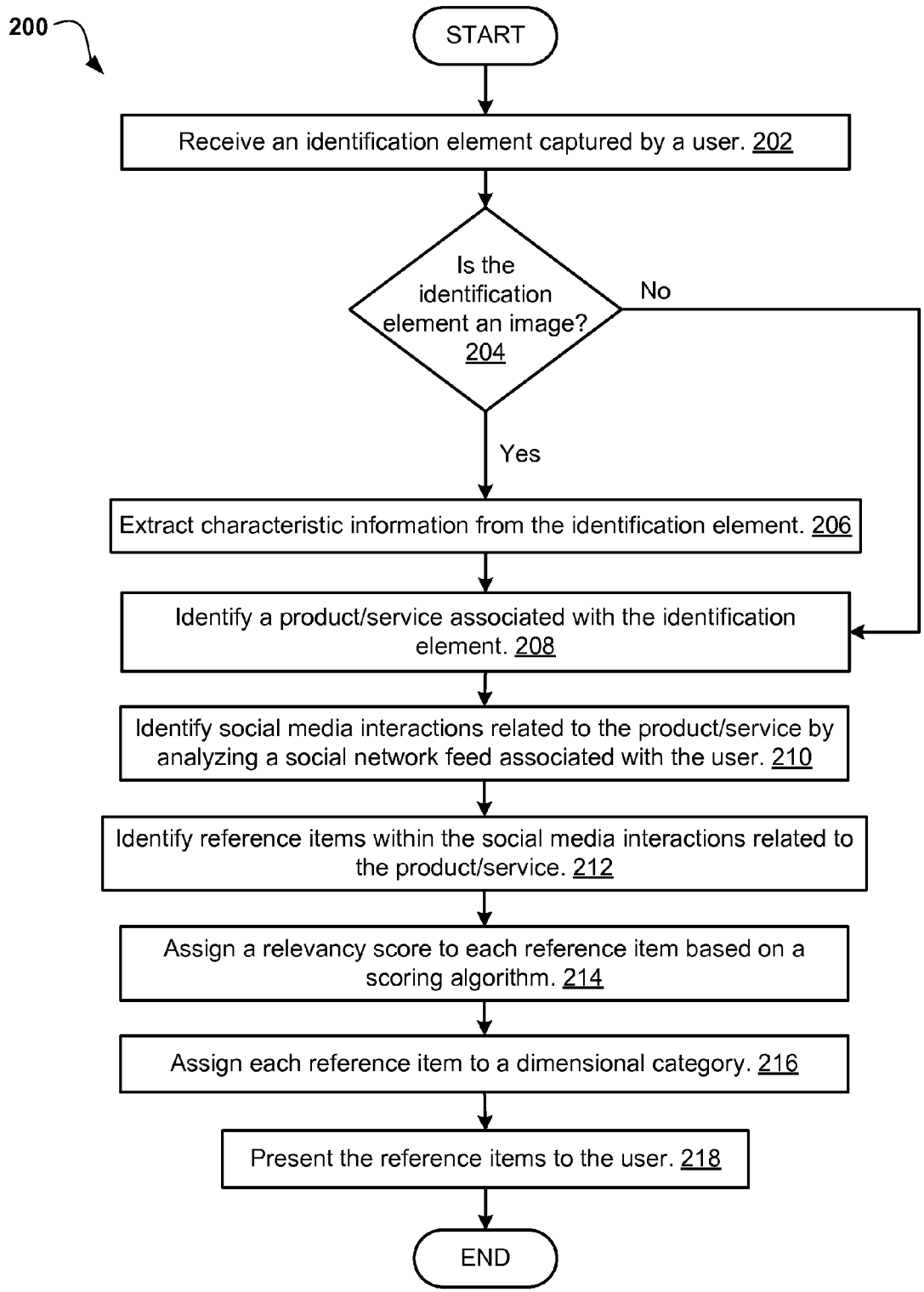
FIG. 2 illustrates a flowchart of the operational steps carried out by a program to recommend products based on an analysis of social media experiences, in accordance with one embodiment of the present invention.

Referring now to FIG. 2, a flowchart 200 of the operational steps carried out by a program to provide product recommendations to users based on a social media network is depicted, in accordance with one embodiment of the present invention. Therefore, at 202, product recommendation program 112A, 112B may first receive an identification element captured by a user. An identification element may be an image or a visual code, such as a barcode, QR code, scan code, product code or alphanumeric identification code, used to identify a product or service. For example, if a user is interested in a pair of pink sneakers displayed on a billboard, the user may take a picture of the billboard containing the pair of pink sneakers and upload the image to product recommendation program 112A, 112B. Similarly, if a user is shopping at a local chain retail store and sees a green jacket in which the user is interested, the user may capture a code, such as a bar code, a QR code, or an alphanumeric identification code, on a device, such as a smartphone, and upload the code to product recommendation program 112A, 112B.

Then at 204, the product recommendation program 112A, 112B may determine if the received identification element is an image. According to one implementation, the method may continue along operational flowchart 200, if the received identification element is an image. If product recommendation program 112A, 112B determines the received identification element is an image (step 204, "YES" branch), product recommendation program 112A, 112B may continue to step 206 to extract characteristic information from the image. If product recommendation program 112A, 112B determines the received identification element is not an image (step 204, "NO" branch), product recommendation program 112A, 112B may continue to step 208 to determine a product or service associated with the received identification element.

If the received identification element is an image, product recommendation program 112A, 112B may continue to step 206 to analyze the image and extract characteristic information associated with the image. Since the user captured image is not associated with any particular product or service, product recommendation program 112A, 112B may use image recognition technology to extract characteristic information, such as tags or keywords, from an image in order to associate a product or service with the image. Image recognition technology may extract distinct shapes from the image and use a shape-to-concept mapping table to identify the tags or keywords related to the image. For example, if product recommendation program 112A, 112B receives an image of a pair of pink sneakers made by Nike® (Nike and all Nike-based trademarks and logos are trademarks or registered trademarks of Nike, Inc. and/or its affiliates), product recommendation program 112A, 112B may use image recognition technology to extract keywords associated with the image, such as pink, sneakers, and Nike®. Furthermore, the extraction of tags and keywords may be augmented with the extraction of any ancillary tag information present in the picture. For example, images in exchangeable image file format (EXIF) contain information relating to the device with which the image was captured and the location where the image was captured.

If multiple distinct shapes are extracted from the image by the image recognition technology, product recommendation program 112A, 112B may implement a weighted scale to determine which distinct shapes correspond to the product or service in which the user is interested. The weighted scale may consider factors, such as the location of a shape within the image, the area of the shape, and the presence of multiples similar shapes. If a shape is positioned at or near the center of the image, the shape may be given greater priority over shapes in a non-center position since centered shapes may indicate the user wished to capture that specific shape. Additionally, if the relative area of the shape compared to the total area of the picture has a high ratio, the shape may be given greater weight since a shape with a high relative area may be of an item on which the user wished to focus the image. Furthermore, if multiple shapes map to the same tags and keywords, each shape may represent the same item. Therefore, the item may receive greater weight since the multiple instances of the shape reinforces the possibility that the user wished to capture one or more of that item in the image.

If the identification element is a code or the characteristic information has been extracted from an image identification element, product recommendation program 112A, 112B may then continue to step 208 to identify a product or service associated with the identification element. As such, the product recommendation program 112A, 112B may analyze the information associated with the identification element and search a repository, such as database 122, to identify a product or service represented in the identification element. For example, if product recommendation program 112A, 112B extracted the keywords pink, sneakers, and Nike® for an image, product recommendation program 112A, 112B may determine the captured image corresponds to a pair of sneakers made by Nike® that are the color pink. Similarly, if the identification element is a code, product recommendation program 112A, 112B may search a repository, such as database 122, for the particular code to determine the product or service associated with the code. For example, if a user captured a code on a label for a green jacket, product recommendation program 112A, 112B may search a repository to determine the code corresponds to a green jacket.

If the code corresponds to a particular manufacturer or retailer, product recommendation program 112A, 112B may search a repository maintained by the manufacturer or retailer that corresponds to the code for the identification element. For example, if product recommendation program 112A, 112B determines a code corresponds to a product produced by Walmart®, product recommendation program 112A, 112B may query a database maintained by Walmart® to locate the product associated with the code.

Additionally, product recommendation program 112A, 112B may search one or more repositories when identifying the product or service associated with the identification element. For example, product recommendation program 112A, 112B may search a repository maintained by various retail stores, such as Walmart® (Walmart and all Walmart-based trademarks and logos are trademarks or registered trademarks of Wal-Mart Stores, Inc. and/or its affiliates) and Target® (Target and all Target-based trademarks and logos are trademarks or registered trademarks of Target Corporation and/or its affiliates), to identify the product or service associated with a particular code.

In another embodiment of the present invention, product recommendation program 112A, 112B may search a particular repository based on the current location of the user when identifying the product or service associated with the identification element. For example, using location services on a device, such as a global positioning system, product recommendation program 112A, 112B may determine a user is inside a Target® store. If the user uploads an identification element while inside the Target® store, product recommendation program 112A, 112B may only search repositories maintained by Target®, since a product or service provided by Target® is likely associated with the identification element.

Then at 210, product recommendation program 112A, 112B may then analyze preconfigured social networks for social media interactions associated with the identified product or service. A user may preconfigure product recommendation program 112A, 112B with one or more social network accounts associated with the user on one or more social media sites 114. The social media interactions may be text, such as Facebook® status updates or Twitter® tweets, or media objects, such as Instagram® image posts. Furthermore, product recommendation program 112A, 112B may analyze social media trends that are popular within the user's network of friends or followers, within the user's region, or among all users in the world. For example, if product recommendation program 112A, 112B identifies pink sneakers as the product of which the user captured a code and the user has preconfigured Facebook® as a social network for product recommendation program 112A, 112B to scan, product recommendation program 112A, 112B may analyze the user's Facebook® news feed for social media interactions that are associated with "sneakers", "pink", or "pink sneakers." Additionally, product recommendation program 112A, 112B may analyze each preconfigured social network in real-time for each identification element received by product recommendation program 112A, 112B.

If a social media interaction is a media object, such as an image or a video, product recommendation program 112A, 112B may implement image recognition technology, previously described above, to identify objects, tags, or keywords referenced within the media object. For example, if the identified product is a pair of pink sneakers, product recommendation program 112A, 112B may use image recognition technology to identify an image of a person running on a treadmill wearing a pair of sneakers while listening to music on an iPod® (iPod and all iPod-based trademarks and logos are trademarks or registered trademarks of Apple Inc. and/or its affiliates) as a social media interaction referencing the identified product. Product recommendation program 112A, 112B may include the tags or keywords "sneakers," "iPod®," and "treadmill" with the social media interaction since each item was present in the image.

If a social media interaction is a text object, product recommendation program 112A, 112B may implement concept extraction to identify products or services mentioned within the social media interaction that are semantically related to the tags or keywords. Concept extraction is a data mining technique that extracts useful information from a data set. For example, if a user posts a Facebook® status update that he ran ten miles on a track in new sneakers while listening to his favorite music on his iPod®, product recommendation program 112A, 112B may identify the tags or keywords "sneakers," "iPod®," and "track" with the social media interaction since each item was referenced in the text post.

In another embodiment of the present invention, product recommendation program 112A, 112B may analyze a preconfigured social network for the user associated with social media site 114 on regular time intervals and store the analysis results in a repository, such as database 122. For example, product recommendation program 112A, 112B may be preconfigured to analyze a social network associated with the user once each day. Therefore, once-a-day, product recommendation program 112A, 112B may analyze the social network for new social media interactions, assign tags and keywords associated with each social media interaction, and store the social media interactions and identified tags and keywords in a repository. Therefore, product recommendation program 112A, 112B may search the repository for social media interactions that already include tags and keywords of product or services associated with each social media interaction rather than conducting a new analysis for each received identification element.

In yet another embodiment of the present invention, product recommendation program 112A, 112B may implement a hybrid analysis approach by analyzing a preconfigured social network for the user associated with social media site 114 both on regular time intervals and in real-time. For example, product recommendation program 112A, 112B may be preconfigured to analyze a social network associated with the user once each day and store the results from each daily analysis in a repository. When a product or service is identified from an identification element, product recommendation program 112A, 112B may analyze the social network only for social media interactions that occurred after the daily preconfigured analysis. Product recommendation program 112A, 112B may then search the repository containing the results of each daily analysis of the social network for references to the identified item. Therefore, product recommendation program 112A, 112B may obtain efficient, accurate results by only conducting a limited analysis of the preconfigured social media networks and searching the repository for social media interactions that are already assigned tags and keywords.

Once product recommendation program 112A, 112B identifies a social media interaction that includes a reference item to the identified product or service, product recommendation program 112A, 112B may continue to step 212 to identify other products or services referenced within the social media interactions. For example, if the identified item is "sneakers" and product recommendation program 112A, 112B identifies an image with tags and keywords of "sneakers," "iPod®," and "treadmill" as a relevant social media interaction, product recommendation program 112A, 112B may identify an iPod and a treadmill as reference items within the social media interaction associated with the identified item of "sneakers."

Next at 214, product recommendation program 112A, 112B may then calculate a relevancy score to each reference item based on a scoring algorithm. The relevancy score may be calculated to each reference item in order to identify the reference items that are most relevant to the identified item of interest to the user. For each reference item, product recommendation program 112A, 112B may calculate a relevancy score using a normalized scoring algorithm. The normalized scoring algorithm may calculate a relevancy score based on the frequency of association each reference item has with the identified item. For example, if product recommendation program 112A, 112B identifies four social media interactions containing "sneakers" and an iPod® is a reference item in three out of the four social media interactions, the normalized scoring algorithm may give a relevancy score of 75% to the iPod reference item since that reference item is associated with three out of the four identified social media interactions. Furthermore, product recommendation program 112A, 112B may discard reference items given a relevancy score below a threshold value is reference items with a low relevancy score may be semantically weak relationships to the identified item.

Then at 216, product recommendation program 112A, 112B may assign a dimensional category to the reference items based on the assigned relevancy score. In order to properly organize the reference items, each reference item may be assigned to dimensional category, such as people, places, things, and times. The "people" dimensional category may contain contacts and other related items associated with each contact. For example, if a user wishes to view all reference items mentioned by a contact within the user's social network, the user may select that contact and product recommendation program 112A, 112B may present each reference item mentioned in social media interactions by the selected contact. The "places" dimensional category show locations and items presented in each location. For example, a user may select Walmart® and product recommendation program 112A, 112B may present all reference items associated with a Walmart® store mentioned in social media interactions on the user's social media network. The "things" dimensional category may show the items in order of relevancy. For example, if item A was assigned a relevancy score of 50%, item B was assigned a relevancy score of 75%, and item C was assigned a relevancy score of 25%, product recommendation program 112A, 112B may display the list of reference items in relevancy score order to the user. The "times" dimensional category may allow reference items to be presented in the time context of when they were posted. For example, a user may select to have product recommendation program 112A, 112B present all reference items associated with a particular time period during the day. Similarly, the "times" dimensional category may allow product recommendation program 112A, 112B to present reference items associated with a particular event, such as a sporting event or a television show airing.

Next at 218, product recommendation program 112A, 112B may then present the categorized reference items to the user in a preconfigured context. Product recommendation program 112A, 112B may be capable of presenting the reference items in several preconfigured variations, such as presenting the number of the user's contacts that are interested in or have purchased or posted information about particular reference items, presenting attributes about the identified item as those attributes relate to statistics on social media networks, and presenting the referenced items to the user as a recommended set of related items filtered by user preferred categories.

In another embodiment of the present invention, product recommendation program 112A, 112B may send a notification alert to a user under preconfigured circumstances when product recommendation program 112A, 112B receives an identification element. For example, if the identified product represented in the identification element is already owned by a threshold number of user contacts in a social network, product recommendation program 112A, 112B may notify the user since the user may not want to purchase an item, such as a specific shirt or jacket, contacts in the user's social network already own. Similarly, a notification may be sent to the user when product recommendation program 112A, 112B determines that none of the user's social network contacts own or have posted about the same or a similar product as the identified item.

Figure 3:
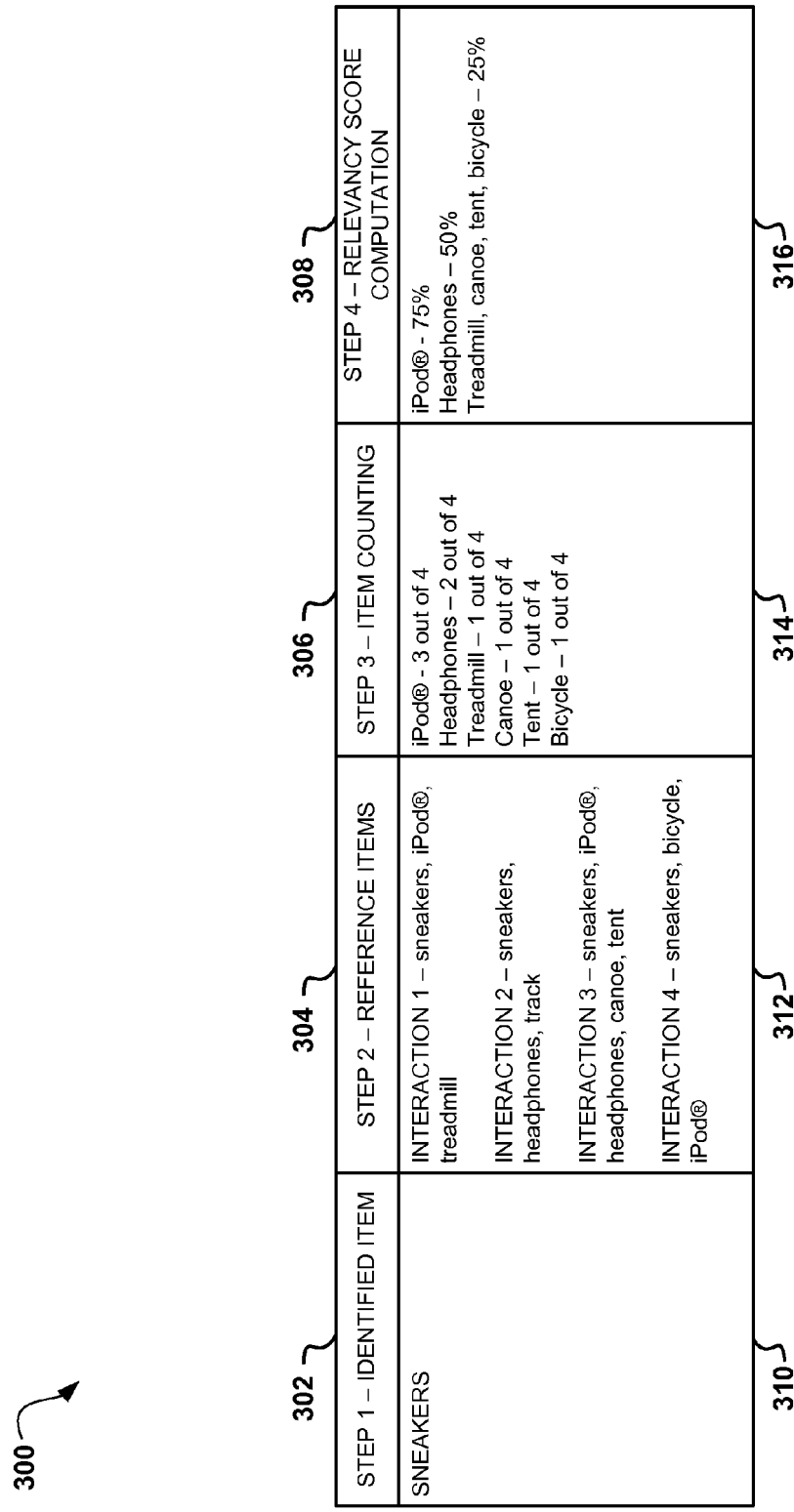
FIG. 3 is a functional block diagram illustrating the steps of calculating a relevancy score carried out by the product recommendation system of FIG. 1, in accordance with one embodiment of the present invention.

Referring now to FIG. 3, a functional block diagram 300 illustrating the steps of calculating a relevancy score carried is depicted, in accordance with one embodiment of the present invention. Functional block diagram 300 illustrates the four steps 302-308 for calculating a relevancy score for reference items associated with social network interactions. The first step 302 may be to determine the identified item 310. For example, "sneakers" is the identified item 310 in FIG. 3. The second step 304 may be to determine social media interactions 312 that include a reference to the identified item 302. For example, four social media interactions 312 may be identified with references to sneakers. The social media interactions 312 may include one or more reference items to other references. For example, the four social media interactions 312 include reference items for "iPod®," "treadmill," "headphones," "track," "canoe," "tent," and "bicycle" in addition to a reference item in each to "sneakers." The third step 306 may be to determine the total occurrences 314 each reference item makes within the total number of social media interactions with references to sneakers. For example, the total occurrences 314 of each reference item is three for the "iPod®" reference item, two for the "headphones" reference item, and one each for the "treadmill" reference item, "track" reference item, "canoe" reference item, "tent" reference item and "bicycle" reference item. The fourth step 308 may be to compute the relevancy score for each reference item 316. The relevancy score may be computed by dividing the total occurrences of each reference item in a social media interact as calculated in the third step 306 by the total number of social media interactions containing a reference to the identified item. For example, the relevancy score computation 316 may be 75% for the "iPod®" reference item since the "iPod®" reference item appears in three out of the four total social media interactions containing a reference to "sneakers." Similarly, the "headphones" reference item may have a calculated relevancy score of 50% and each of the "treadmill" reference item, "canoe" reference item, "tent" reference item, and "bicycle" reference item may have a relevancy score of 25%.

Figure 4:
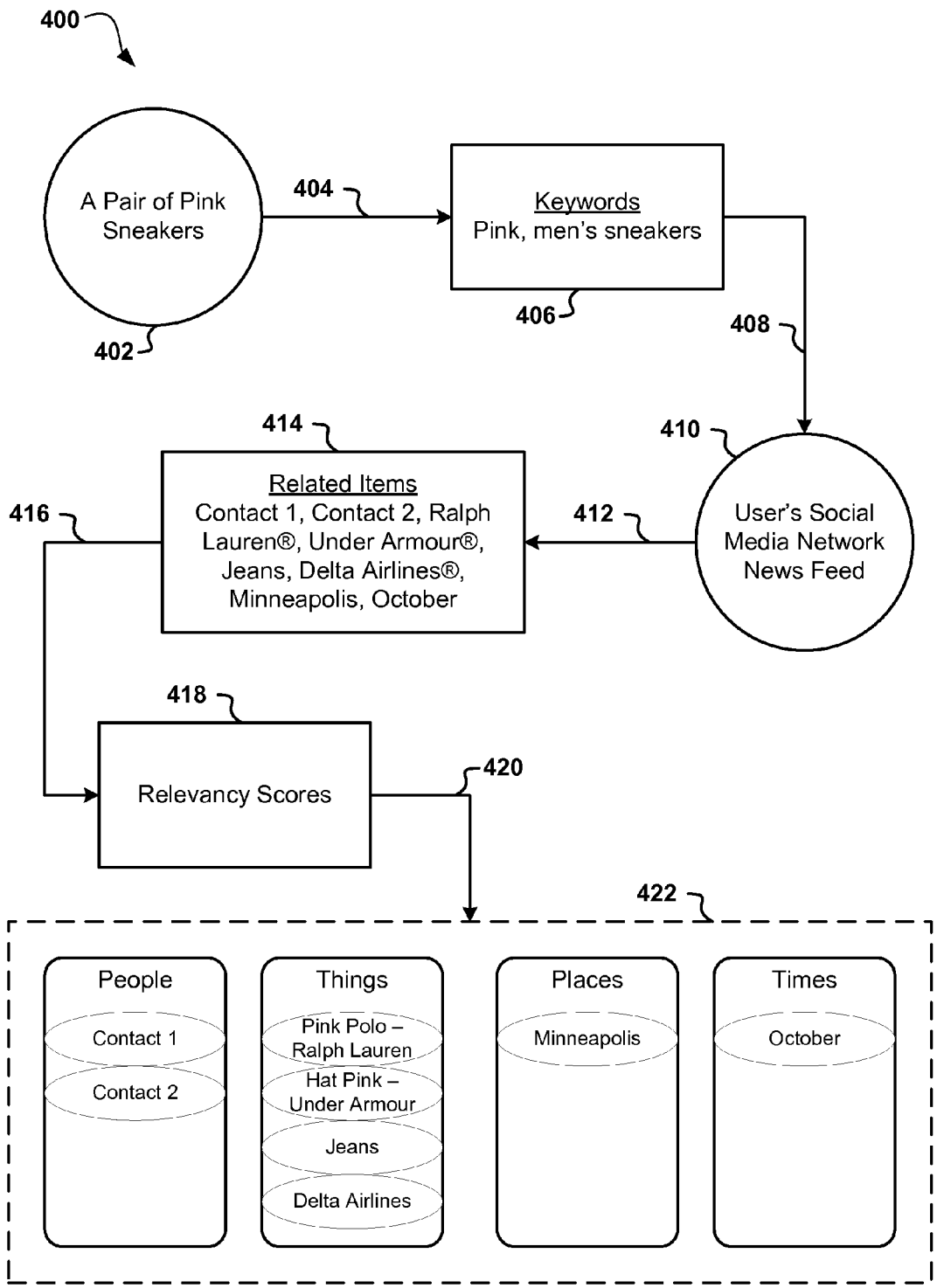
FIG. 4 is a functional block diagram illustrating the steps of the product recommendation system of FIG. 1, in accordance with one embodiment of the present invention.

FIG. 4 is a functional block diagram 400 illustrating the steps of the product recommendation system, in accordance with one embodiment of the present invention. A user may first select a photograph of a pair of pink men's sneakers 402. Then at 404, product recommendation program 112A, 112B may then use image recognition techniques to extract keywords 406 associated with the image. For example, product recommendation program 112A, 112B may determine the keywords 406 associated with the photograph of the pink men's sneakers are "pink" and "men's sneakers." Next at 408, product recommendation program 112A, 112B may identify a relevant social network news feed 410 from preconfigured social networks associated with the user. Then at 412, product recommendation program 112A, 112B may identify social media interactions containing keywords 406. Product recommendation program 112A, 112B may implement natural language processing and image recognition techniques to extract items 414 related to keywords 406. Product recommendation program 112A, 112B may also determine related items 414 by identifying social network interactions containing content semantically related to keywords 406. For example, social network interactions containing a first user contact wearing a pink Ralph Lauren® (Ralph Lauren and all Ralph Lauren-based trademarks and logos are trademarks or registered trademarks of Ralph Lauren Corporation and/or its affiliates) polo shirt and jeans, a second user contact wearing a pink Under Armour® (Under Armour and all Under Armour-based trademarks and logos are trademarks or registered trademarks of Under Armour, Inc. and/or its affiliates) hat, a post from Delta® Airlines (Delta and all Delta-based trademarks and logos are trademarks or registered trademarks of Delta Air Lines, Inc. and/or its affiliates) supporting breast cancer awareness, and a post from a breast cancer conference in Minneapolis in October may all be identified by product recommendation program 112A, 112B as social media interactions semantically related to the photograph of the pair of pink men's sneakers 402. Therefore, product recommendation program 112A, 112B may extract Contact 1, Contact 2, Ralph Lauren, Under Armour, Jeans, Delta Airlines, Minneapolis, and October as related items 414. Then at 416, product recommendation program 112A, 112B may compute relevancy scores 418 and rank each related item 414. Product recommendation program 112A, 112B may discard any of related items 414 that fall below a threshold relevancy score since those related items 414 may be weak semantic relations to the photograph of a pair of pink men's sneakers 402. Next at 420, product recommendation program 112A, 112B may assign each related item 414 assigned a relevancy score 418 above the threshold to a dimensional category, such as people, things, places, and times. For example, product recommendation program 112A, 112B may assign Contact 1 and Contact 2 to the "people" dimensional category and Minneapolis to the "places" dimensional category. Product recommendation program 112A, 112B may then present the categorized results 422 to the user.

Figure 5:
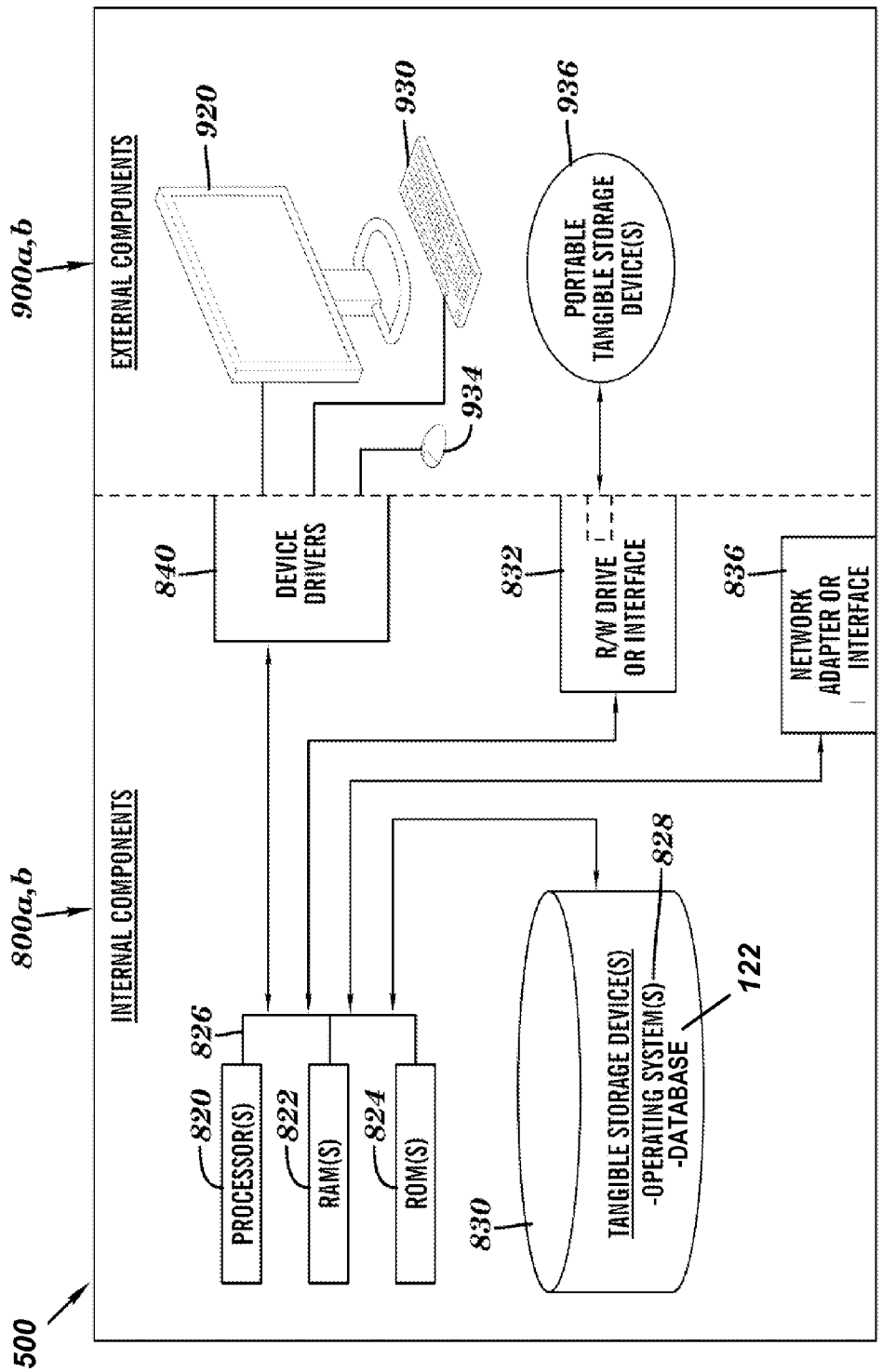
FIG. 5 is a block diagram depicting the hardware components of the product recommendation system of FIG. 1, in accordance with an embodiment of the invention.

FIG. 5 is a block diagram 500 of internal and external components of computer 110 and server 120A, 120B depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 110, and network server 120A, 120B may include respective sets of internal components 800 a, b and external components 900 a, b illustrated in FIG. 5. Each of the sets of internal components 800 a, b includes one or more processors 820, one or more computer-readable RAMs 822 and one or more computer-readable ROMs 824 on one or more buses 826, and one or more operating systems 828, one or more databases 122 and one or more computer-readable tangible storage devices 830. The one or more operating systems 828 and the product recommendation program 112A in client computer 110 and product recommendation program 112B in network server computer 120A are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as product recommendation program 112A and 112B, can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The product recommendation program 112A in client computer 110 and the product recommendation program 112B in network server 120A can be downloaded to client computer 110 from an external computer via a network (for example, the Internet, a local area network or other, wide area network) and respective network adapters or interfaces 836. From the network adapters or interfaces 836, the product recommendation program 112A in client computer 110 and the product recommendation program 112B in network server computer 120A are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor implemented method for recommending a plurality of products, the method comprising:

receiving, by a processor, an identification element associated with an image or a visual code captured by a user;

identifying a first item associated with the identification element, wherein the first item is one of a product or a service, and wherein identifying the first item associated with the identification element further comprises:

determining the identification element is an image;

analyzing the received identification element using image recognition technology;

identifying a plurality of shapes within the analyzed identification element;

applying a weight to each of the identified plurality of shapes; and determining the first item based on a highest weighted shape within the identified plurality of shapes, wherein the weight assigned to the identified plurality of shapes is based on at least one of a proximity of each of the identified plurality of shapes to an image center, a shape area relative to an image area, and a total count of a plurality of duplicate shapes;

identifying at least one of a tag and a keyword associated with the first item;

identifying at least one social media interaction within a social media network that references at least one of the first item, the tag, and the keyword, wherein the social media network is associated with the user;

identifying at least one second item referenced in the at least one social media interaction, wherein the at least one second item is a product or a service; and determining a score for the at least one second item based on an algorithm, wherein the algorithm determines the score for the at least one second item based on a frequency the at least one second item appears in the at least one social media interaction.

2. The method of claim 1, further comprising:

determining a category for the at least one second item based on a dimension of the at least one second item;

filtering the at least one second item based on the determined score and the determined category; and displaying the filtered at least one second item.

3. The method of claim 1, wherein identifying the first item further comprises:

determining the identification element is a visual code; and identifying the first item by searching at least one repository, wherein the at least one repository includes a plurality of codes associated with at least one of a plurality of products and a plurality of services.

4. The method of claim 1, wherein determining the score for the at least one second item includes filtering the at least one second item associated with a score below a preconfigured threshold.

5. The method of claim 1, wherein identifying the at least one social media interaction that references the first item is performed in real time, based on at least one preconfigured time interval, or through a hybrid of real time and at least one preconfigured time interval.

6. A computer system for recommending products, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving, by a processor, an identification element associated with an image or a visual code captured by a user;

identifying a first item associated with the identification element, wherein the first item is one of a product or a service, and wherein identifying the first item associated with the identification element further comprises:
   determining the identification element is an image;
   analyzing the received identification element using image recognition technology;
   identifying a plurality of shapes within the analyzed identification element;
   applying a weight to each of the identified plurality of shapes; and
   determining the first item based on a highest weighted shape within the identified plurality of shapes, wherein the weight assigned to the identified plurality of shapes is based on at least one of a proximity of each of the identified plurality of shapes to an image center, a shape area relative to an image area, and a total count of a plurality of duplicate shapes;
identifying at least one of a tag and a keyword associated with the first item;
identifying at least one social media interaction within a social media network that references at least one of the first item, the tag, and the keyword, wherein the social media network is associated with the user;
identifying at least one second item referenced in the at least one social media interaction, wherein the at least one second item is a product or a service; and
determining a score for the at least one second item based on an algorithm, wherein the algorithm determines the score for the at least one second item based on a frequency the at least one second item appears in the at least one social media interaction.

7. The computer system of claim 6, further comprising:
determining a category for the at least one second item based on a dimension of the at least one second item;
filtering the at least one second item based on the determined score and the determined category; and
displaying the filtered at least one second item.

8. The computer system of claim 6, wherein identifying the first item further comprises:
   determining the identification element is a visual code; and
   identifying the first item by searching at least one repository, wherein the at least one repository includes a plurality of codes associated with at least one of a plurality of products and a plurality of services.

9. The computer system of claim 6, wherein determining the score for the at least one second item includes filtering the at least one second item associated with a score below a preconfigured threshold.

10. The computer system of claim 6, wherein identifying the at least one social media interaction that references the first item is performed in real time, based on at least one preconfigured time interval, or through a hybrid of real time and at least one preconfigured time interval.

11. A computer program product for recommending products, the computer program product comprising:
   one or more computer-readable tangible storage medium and program instructions stored on at least one of the one or more tangible storage medium, the program instructions executable by a processor, the program instructions comprising:
   program instructions to receive, by a processor, an identification element associated with an image or a visual code captured by a user;
   program instructions to identify a first item associated with the identification element, wherein the first item is one of a product or a service, and wherein identifying the first item associated with the identification element further comprises:
      program instructions to determine the identification element is an image;
      program instructions to analyze the received identification element using image recognition technology;
      program instructions to identify a plurality of shapes within the analyzed identification element;
      program instructions to apply a weight to each of the identified plurality of shapes; and
      program instructions to determine the first item based on a highest weighted shape within the identified plurality of shapes, wherein the weight assigned to the identified plurality of shapes is based on at least one of a proximity of each of the identified plurality of shapes to an image center, a shape area relative to an image area, and a total count of a plurality of duplicate shapes;
   program instructions to identify at least one of a tag and a keyword associated with the first item;
   program instructions to identify at least one social media interaction within a social media network that references at least one of the first item, the tag, and the keyword, wherein the social media network is associated with the user;
   program instructions to identify at least one second item referenced in the at least one social media interaction, wherein the at least one second item is a product or a service; and
   program instructions to determine a score for the at least one second item based on an algorithm, wherein the algorithm determines the score for the at least one second item based on a frequency the at least one second item appears in the at least one social media interaction.

12. The computer program product of claim 11, further comprising:
   program instructions to determine a category for the at least one second item based on a dimension of the at least one second item;
   program instructions to filter the at least one second item based on the determined score and the determined category; and
   program instructions to display the filtered at least one second item.

13. The computer program product of claim 11, wherein identifying the first item further comprises:
   program instructions to determine the identification element is a visual code; and
   program instructions to identify the first item by searching at least one repository, wherein the at least one repository includes a plurality of codes associated with at least one of a plurality of products and a plurality of services.

14. The computer program product of claim 11, wherein determining the score for the at least one second item includes filtering the at least one second item associated with a score below a preconfigured threshold.

* * * * *